(12) United States Patent
Wilson

(10) Patent No.: US 6,876,834 B2
(45) Date of Patent: Apr. 5, 2005

(54) POWER INSERTER CONFIGURATION FOR WIRELESS MODEMS

(75) Inventor: Eric K. Wilson, Cupertino, CA (US)

(73) Assignee: Vyyo, Ltd., Jerusalem (IL)

(*) Notice: Subject to any disclaimer, the term of this patent is extended or adjusted under 35 U.S.C. 154(b) by 679 days.

(21) Appl. No.: 09/771,032

(22) Filed: Jan. 26, 2001

(65) Prior Publication Data

US 2001/0036841 A1 Nov. 1, 2001

Related U.S. Application Data

(60) Provisional application No. 60/178,153, filed on Jan. 26, 2000.

(51) Int. Cl.[7] .............................. H04B 7/00; H04H 1/00
(52) U.S. Cl. .................. 455/3.05; 455/343.1; 455/291; 455/127.1; 343/756
(58) Field of Search ................................. 455/557, 277, 455/276.1, 343.1, 3.05, 131, 291, 127.1; 343/876, 840, 756

(56) References Cited

U.S. PATENT DOCUMENTS

| | | |
|---|---|---|
| 4,010,465 A | 3/1977 | Dodington et al. |
| 4,099,121 A | 7/1978 | Fang |
| 4,385,384 A | 5/1983 | Rosbury et al. |
| 4,876,737 A * | 10/1989 | Woodworth et al. ........ 455/12.1 |
| 5,052,024 A | 9/1991 | Moran, III et al. |
| 5,272,700 A | 12/1993 | Hansen et al. |
| 5,311,550 A | 5/1994 | Fouche et al. |
| 5,377,035 A | 12/1994 | Wang et al. |
| 5,408,349 A | 4/1995 | Tsushima et al. |
| 5,471,645 A | 11/1995 | Felix |
| 5,481,542 A | 1/1996 | Logston et al. |
| 5,481,561 A | 1/1996 | Fang |
| 5,487,099 A | 1/1996 | Maekawa |
| 5,510,859 A | 4/1996 | Douglass et al. |
| 5,557,612 A | 9/1996 | Bingham |

(Continued)

FOREIGN PATENT DOCUMENTS

| | | |
|---|---|---|
| CA | 2187141 | 4/1998 |
| EP | 0021 544 A1 | 1/1981 |

OTHER PUBLICATIONS

Starband User Guide, Version 5.21, Document No. STR–0001–5.21, Starband Communications Inc. 1760 Old Meadow Road, Mclean VA 22102, pp. 12–19.*

Golestani, S. (1995) "Network Delay Analysis of a Class of Fair Queueing Algorithms", *IEEE Journal on Selected Areas in Communication* 13(6):1057–1070.

(Continued)

Primary Examiner—Edward F. Urban
Assistant Examiner—Blane J. Jackson
(74) Attorney, Agent, or Firm—Reed Smith LLP; John W. Carpenter

(57) ABSTRACT

A wireless modem contains a power inserter circuit along with the traditional modem components. The power inserter circuit isolates the modem components from DC power that is inserted on the coaxial cable to a transverter. One embodiment of the present invention provides for a wireless modem that contains separate power connections for the modem components and the transverter. Another embodiment of the present invention provides for one power connection for the wireless modem and a DC-to-DC converter for the modem component power. The power source is selected based on the power requirements of the transverter and the DC-to-DC-converter converts the input voltage into the voltage level required by the modem components. By incorporating the power inserter within the modem enclosure, power cannot be accidentally inserted into the modem.

21 Claims, 3 Drawing Sheets

U.S. PATENT DOCUMENTS

| | | | |
|---|---|---|---|
| 5,590,409 | A | 12/1996 | Sawahashi et al. |
| 5,596,604 | A | 1/1997 | Cioffi et al. |
| 5,606,664 | A | 2/1997 | Brown et al. |
| 5,625,874 | A | 4/1997 | Uchida et al. |
| 5,634,206 | A | 5/1997 | Reed et al. |
| 5,666,646 | A | 9/1997 | McCollum et al. |
| 5,699,384 | A * | 12/1997 | Dillon .................. 375/316 |
| 5,724,385 | A | 3/1998 | Levin et al. |
| 5,734,589 | A | 3/1998 | Kostreski et al. |
| 5,740,525 | A | 4/1998 | Spears |
| 5,752,161 | A | 5/1998 | Jantti et al. |
| 5,796,783 | A | 8/1998 | Crawford |
| 5,809,090 | A | 9/1998 | Buternowsky et al. |
| 5,809,406 | A | 9/1998 | Taki et al. |
| 5,809,427 | A | 9/1998 | Perreault et al. |
| 5,818,825 | A | 10/1998 | Corrigan et al. |
| 5,831,690 | A | 11/1998 | Lyons et al. |
| 5,862,451 | A | 1/1999 | Grau et al. |
| 5,867,528 | A | 2/1999 | Verbueken |
| 5,893,023 | A * | 4/1999 | Vizer .................. 455/3.02 |
| 5,896,414 | A | 4/1999 | Meyer et al. |
| 5,903,558 | A | 5/1999 | Jones et al. |
| 5,909,384 | A | 6/1999 | Tal et al. |
| 5,937,005 | A | 8/1999 | Obuchi et al. |
| 5,940,743 | A | 8/1999 | Sunay et al. |
| 5,963,843 | A | 10/1999 | Sit et al. |
| 5,963,870 | A | 10/1999 | Chheda et al. |
| 5,974,106 | A | 10/1999 | Dupont |
| 5,978,855 | A | 11/1999 | Metz et al. |
| 5,991,286 | A | 11/1999 | Labonte et al. |
| 6,009,310 | A | 12/1999 | Motohashi |
| 6,035,008 | A | 3/2000 | Kim |
| 6,052,408 | A | 4/2000 | Trompower et al. |
| 6,072,839 | A | 6/2000 | Mondal et al. |
| 6,075,787 | A | 6/2000 | Bobeck et al. |
| 6,075,970 | A * | 6/2000 | Van Amesfoort |
| 6,111,887 | A | 8/2000 | Daily et al. |
| 6,112,232 | A | 8/2000 | Shahar et al. |
| 6,128,588 | A | 10/2000 | Chacon |
| 6,140,911 | A | 10/2000 | Fisher et al. |
| 6,141,356 | A | 10/2000 | Gorman |
| 6,157,311 | A | 12/2000 | Berkovich |
| 6,160,447 | A | 12/2000 | Huang |
| 6,172,970 | B1 | 1/2001 | Ling et al. |
| 6,185,227 | B1 | 2/2001 | Sipola |
| 6,195,697 | B1 | 2/2001 | Bowman-Amuah |
| 6,211,844 | B1 * | 4/2001 | Davi et al. .................. 343/876 |
| 6,549,091 | B1 * | 4/2003 | Spurell et al. .............. 333/124 |
| 6,788,950 | B1 * | 9/2004 | Raissinia et al. ........... 455/522 |

OTHER PUBLICATIONS

Stiliadis, D. et al. (1998) "Rate–Proportional Servers: A Design Methodology for Fair Queueing Algorithms", *IEEE/ACM Transactions of Networking* 6(2):164–174.

Stiliadis, D. et al. (1998) "Efficient Fair Queuing Algorithms for Packet–Switched Networks", *IEEE/ACM Transactions of Networking* 6(2):175–185.

Data Over Cable Interface Specifications, Cable Modems Termination System–Network Side Interface Specification, SP–CMTS–NSII01–960702 (Jul. 2, 1996) pp. i–13.

Data–Over–Cable Service Interface Specifications, Cable Modem to Customer Premise Equipment Interface Specification. SP–CMC1–102–980317 (Mar. 17, 1998) pp. i–40.

Data–Over–Cable Service Interface Specifications, Radio Frequency Interface Specification, SP–RFI–I04–980724 (Jul. 24, 1998) pp. i–196.

Data–Over–Cable Service Interface Specifications, Operations Support System Interface Specification SP–OSSI–102–990113 (Jan. 13, 1999) pp. i–14.

Data–Over–Cable Service Interface Specifications, Operations Support System Interface Specification Radio Frequency Interface, SP–OSSI–RFI–103–990113 (Jan. 13, 1999) pp. i–29.

Data–Over–Cable Service Interface Specifications, Baseline Privacy interface Specification, SP–BPI–102–990319 (Mar. 19, 1999) pp. i–88.

Data–Over–Cable Service Interface Specification, Baseline Privacy Interface Specification, SP–BPI–102–990731 (Jul. 31, 1999) pp. i–160.

Data–Over–Cable Service Interface Specifications, Radio Frequency Interface Specification, SP–RFIv1.1–I03–991105 (Nov. 5, 1999) pp. i–366.

Data–Over–Cable Service Interface Specifications, Operations Support System Interface Specification SP–OSSIv1.1–D01–991115 (Nov. 15, 1999) pp. i–81.

Data–Over–Cable Service Interface Specifications, Operations Support System Interface Specification SP–OSSIv1.1–103–001220 (Dec. 20, 2000) p. ii.

* cited by examiner

POWER INSERTER CONFIGURATION FOR WIRELESS MODEMS

CROSS-REFERENCE TO RELATED APPLICATIONS

This application claims priority from U.S. Provisional Application entitled POWER INSERTER CONFIGURATION FOR WIRELESS MODEMS, filed Jan. 26, 2000, application Ser. No. 60/178,153, the disclosure of which is herein incorporated by reference.

BACKGROUND OF THE INVENTION

1. Field of the Invention

The present invention relates generally to the field of wireless modems, and more particularly to a power inserter configuration for wireless modems.

2. Description of the Related Art

In order to provide high-speed Internet access, many cable companies are providing broadband Internet access via traditional coaxial cable. Modernly, cable systems comprise a fiber optic network, with coaxial cable lines connecting each residence to a "head-end." These systems are commonly referred to as Hybrid Fiber Coax (HFC) systems. Even though cable access provides much greater performance than traditional telephone modem connections, the bandwidth is still not sufficient to provide high-speed access to a large number of users. In order to overcome this problem, wireless modems have recently been proposed in order to bypass the traditional coaxial cable, and connect directly to a "head-end" system.

As shown in FIG. 1, a wireless modem system for each residence may include an antenna connected to a transverter 6, which is usually mounted outside the residence near the antenna. In order to provide electrical power to the transverter 6, without supplying a separate electrical connection, power is "inserted" onto the coaxial data cable that connects the wireless modem 2 and the transverter 6. A power inserter block 4 may be implemented as shown by the circuit 16 of FIG. 2. A capacitor 12 blocks DC from the power inserter power source 10 from entering the modem. An inductor 14 blocks IF from the modem 2 from going to the power inserter power source 10. The result is that all of the IF energy and the DC power is sent to the transverter 6.

The addition of the power inserter circuit 4 saves the expense of installing a separate electrical power connection to the transverter 6, but adds two additional electrical connectors between the modem 2 and the transverter 6. Furthermore, the electrical connectors on the power inserter are generally the same type of connector. If a user accidentally connects the power inserter 4 in the reverse direction, the DC voltage will enter the modem's output connection and possibly cause permanent damage. Thus, there is a need to provide an improved power inserter configuration for wireless modems.

SUMMARY OF THE INVENTION

According to the present invention, a wireless modem contains a power inserter circuit along with the traditional modem components. The power inserter circuit isolates the modem components from DC power that is inserted on the coaxial cable to a transverter. Also, the power inserter circuit isolates a power source from the IF energy from the modem components that is sent to the transverter. One embodiment of the present invention further provides for a wireless modem that contains separate power connections for the modem components and the transverter. Another embodiment of the present invention provides for one power connection for the wireless modem and a DC-to-DC converter for the modem component power. The power source is selected based on the power requirements of the transverter and the DC-to-DC converter converts the input voltage to the voltage level required by the modem components.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a power inserter configuration for wireless modem systems.

Figure 1:
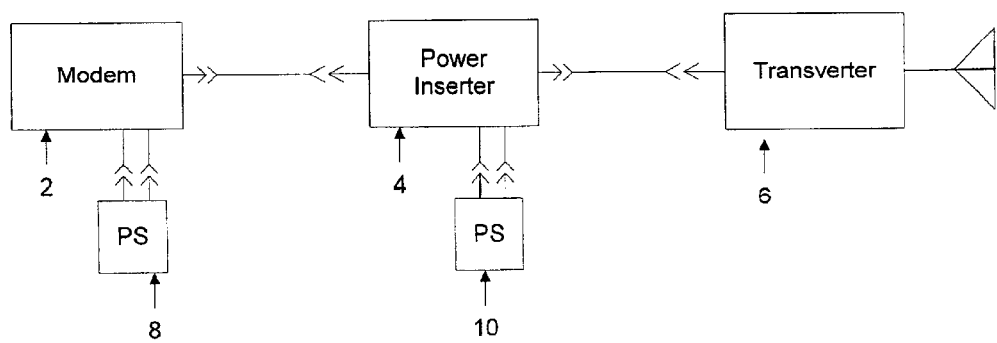
FIG. 1 is a block diagram of a prior art wireless modem system.
Figure 2:
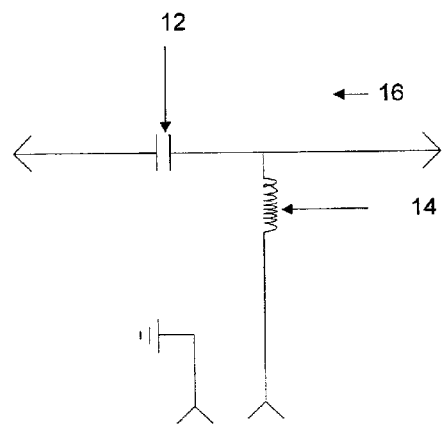
FIG. 2 is a schematic of the power inserter circuit of FIG. 1.
Figure 3:
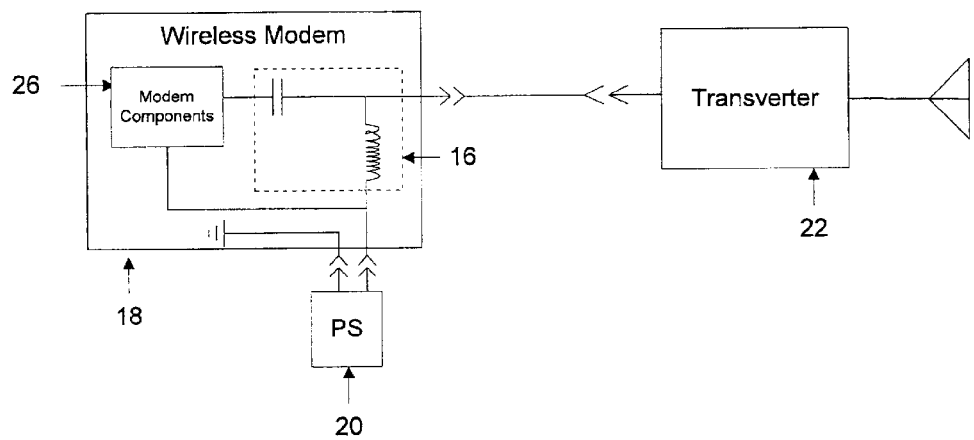
FIG. 3 is a block diagram of a power inserter and wireless modem configured according to the present invention.

According to the present invention, a wireless modem 18 includes a power inserter circuit 16 to provide electrical power to a transverter 22 via a coaxial cable, as illustrated in FIG. 3. The wireless modem 18 also contains modem components 26, which is the circuitry traditionally found in modems known by those skilled in the art. The coaxial cable also provides a signal path for data transfer between the wireless modem 18 and the transverter 22. The power inserter circuit 16 shields the output of the modem components 26 from DC power insertion from a power source 20. Also, the power inserter circuit 16 shields the power source 20 from IF energy from the output of the modem components 26. Thus, the present invention eliminates the possibility of accidental voltage injection into the wireless modem 18.

In practical use, the transverter 22 may require different voltages depending on the manufacturer of the transverter 22. Typically, the voltages required by the transverter 22 range from 12 to 48 Volts. Unacceptable performance may result if too low of a voltage is used for the transverter 22. A voltage higher than that required by the transverter 22 may result in overheating or other damage to the transverter 22. The varying voltage levels required by the transverter 22 pose a problem because the wireless modem 16 and the transverter 22 may not use the same voltage. Thus, it would be desirable to have a more universal solution.

One solution is to require all transverter manufacturers to include a DC-to-DC converter in all transverters to achieve a fairly wide input voltage tolerance. This solution is not very desirable because it would require all transverter manufacturers to cooperate and agree on the same standards.

Figure 4:
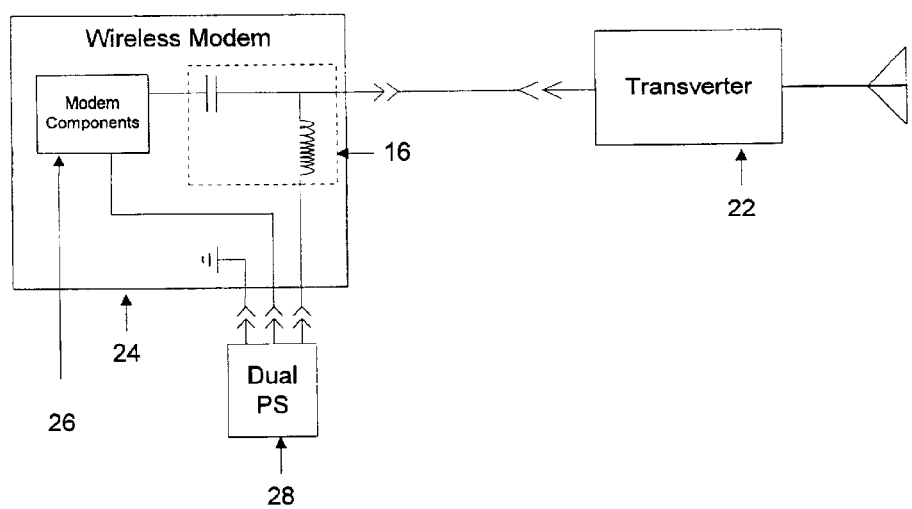
FIG. 4 is a block diagram of the present invention with a dual power source.

A second approach is illustrated in FIG. 4. Here, a dual power source 28 has three connectors for a wireless modem 24: 1) a voltage connector for the modem components 26, 2) a voltage connector for the transverter 22, and 3) a common ground connector. This configuration supplies one voltage level to the modem components 26 and a separate voltage level for the transverter 22 by way of the power inserter circuit 16. This configuration eliminates the need to alter the transverter 22 voltage input. However, having a third connector on the dual power source 28 and the wireless modem 24 is more costly. Also, this configuration is inefficient because it requires a user to obtain a dual power source 28 that matches the required voltage levels of the wireless modem 24 and the transverter 22.

Figure 5:
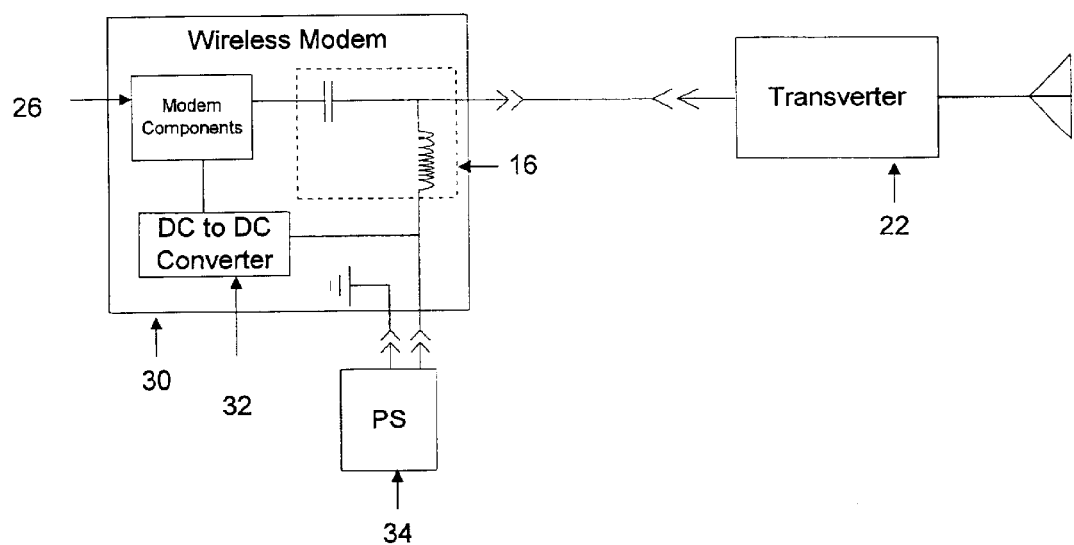
FIG. 5 is a block diagram of the present invention with a DC-to-DC converter in the wireless modem and a single input power source.

A third approach is illustrated in FIG. 5. A wireless modem 30 includes a DC-to-DC converter 32 to allow the wireless modem 30 to accept a wide range of input voltages. In this manner, a power source 34 is selected according to the voltage level required by the transverter 22. If the voltage required by the transverter 22 is not the same as the voltage required by the modem components 26, the DC-to-DC converter 32 converts the input voltage to the voltage level required by the modem components 26 for normal operation. Thus, the present invention eliminates a separate power connection and/or supply for the power inserter circuit 16, additional connections between the wireless modem 30 and the transverter 22, and the possibility of accidental power injection into the output of the modem components 26.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An electronic module for use in a wireless modem system comprising:
   a wireless modem having an enclosure;
   a power inserter circuit contained within the modem enclosure;
   a power source electrically connected to the modem and the power inserter circuit; and
   an output connector connected to the modem and the power inserter circuit;
   wherein the output connector connects to an external transverter and supplies electrical power and an electrical signal to the transverter.

2. The electronic module of claim 1, wherein the power inserter circuit comprises:
   an inductor connected to the power source; and
   a capacitor connected to the output of the modem, the inductor, and the transverter;
   wherein the capacitor blocks DC power from entering the output of the modem and the inductor blocks IF energy from entering the power source.

3. The electronic module of claim 1, wherein the power source is an AC-to-DC converter.

4. The electronic module of claim 3, wherein the AC-to-DC converter is contained within the modem.

5. The electronic module of claim 1, wherein the power source is a dual output voltage power supply.

6. The electronic module of claim 1, further comprising:
   a DC-to-DC converter contained within the modem enclosure and electrically connected to the power source and the modem;
   wherein the DC-to-DC converter outputs a constant voltage to the modem regardless of a change in input voltage from the power source.

7. The electronic module of claim 6, wherein the power source output voltage is set according to a transverter input voltage requirement.

8. A wireless modem system comprising:
   a wireless modem having an enclosure;
   a power inserter circuit contained within the modem enclosure;
   a power source electrically connected to the modem and the power inserter circuit;
   a DC-to-DC converter contained within the enclosure electrically connected to the power source and the modem;
   an output connector connected to the modem and the power inserter circuit;
   a transverter electrically connected to the output connector; and
   an antenna connected to the transverter;
   wherein the transverter receives DC power from the power inserter circuit along with an electrical signal from the modem, and the power inserter circuit isolates the modem components from the DC power sent to the transverter and isolates the power source from the electrical signal sent to the transverter.

9. The system of claim 8, wherein the DC-to-DC converter outputs a constant voltage to the modem regardless of a change in input voltage from the power source.

10. The system of claim 9, wherein the power source output voltage is set according to a transverter input voltage requirement.

11. A cable system, comprising:
    a broadband cable TV and telecommunications related services transmission network comprising multiple nodes on an earth based delivery system configured to transmit broadband services to multiple pluralities of end-users;
    a plurality of wireless head ends coupled at various points to the earth based delivery system, each head end configured to wirelessly provide the broadband services to a plurality of end user locations;
    a wireless modem comprising a modem and a transverter installed as a modem transverter pair at each end user location;
    a single cable installed between the modem and transverter of each modem transverter pair;
    wherein:
    each modem includes a power inserter maintained in a same enclosure as the modem; and
    components of the modem and power inserter are coupled to the single cable and configured to supply power and data signals to the transverter through the single cable.

12. The cable system according to claim 11, wherein:
    the modem and power inserter enclosure is powered by a dual power supply comprising a single external power supply module and individual power leads; and
    the individual power leads consist essentially of a first voltage power lead specifically for powering modem related components in the enclosure, a second voltage power lead specifically for powering power inserter related components in the enclosure, and a ground lead shared by the first and second voltage power leads.

13. The cable system according to claim 12, wherein the power inserter comprises a circuit configured to shield the dual power supply from IF energy emanating from an output of the modem components.

14. The cable system according to claim 13, wherein the power inserter circuit is further configured to shield the output of the modem components from unintended DC power insertion from the dual power supply.

15. The cable system according to claim 11, wherein:
the modem and power inserter enclosure includes a dc-to-dc transformer coupled to modem components within the enclosure; and
the modem components and power inserter in the single enclosure are powered by a dc power supply coupled to components of the power inserter and the dc-to-dc transformer.

16. The cable system according to claim 15, wherein the power inserter comprises a circuit configured to shield the dc power supply from IF energy emanating from an output of the modem components.

17. The cable system according to claim 15, wherein the power inserter comprises a circuit configured to shield the output of the modem components from unintended DC power insertion from the dual power supply.

18. The cable system according to claim 11, wherein the power inserter comprises a circuit configured to shield a power supply of the enclosure from IF energy emanating from an output of the modem components.

19. The cable system according to claim 18, wherein the power inserter circuit is further configured to shield an output of the modem components from unintended DC power insertion from the power supply.

20. The cable system according to claim 19, wherein the head ends are coupled to the network at a coaxial cable delivery system.

21. The cable system according to claim 19, wherein at least one of the delivery systems is a Hybrid Fiber Coax (HFC) system.

* * * * *